March 25, 1941.    G. W. FLETCHER    2,236,091
COMBINED TRAILER AND TENT CONSTRUCTION
Filed Sept. 3, 1940    3 Sheets-Sheet 1
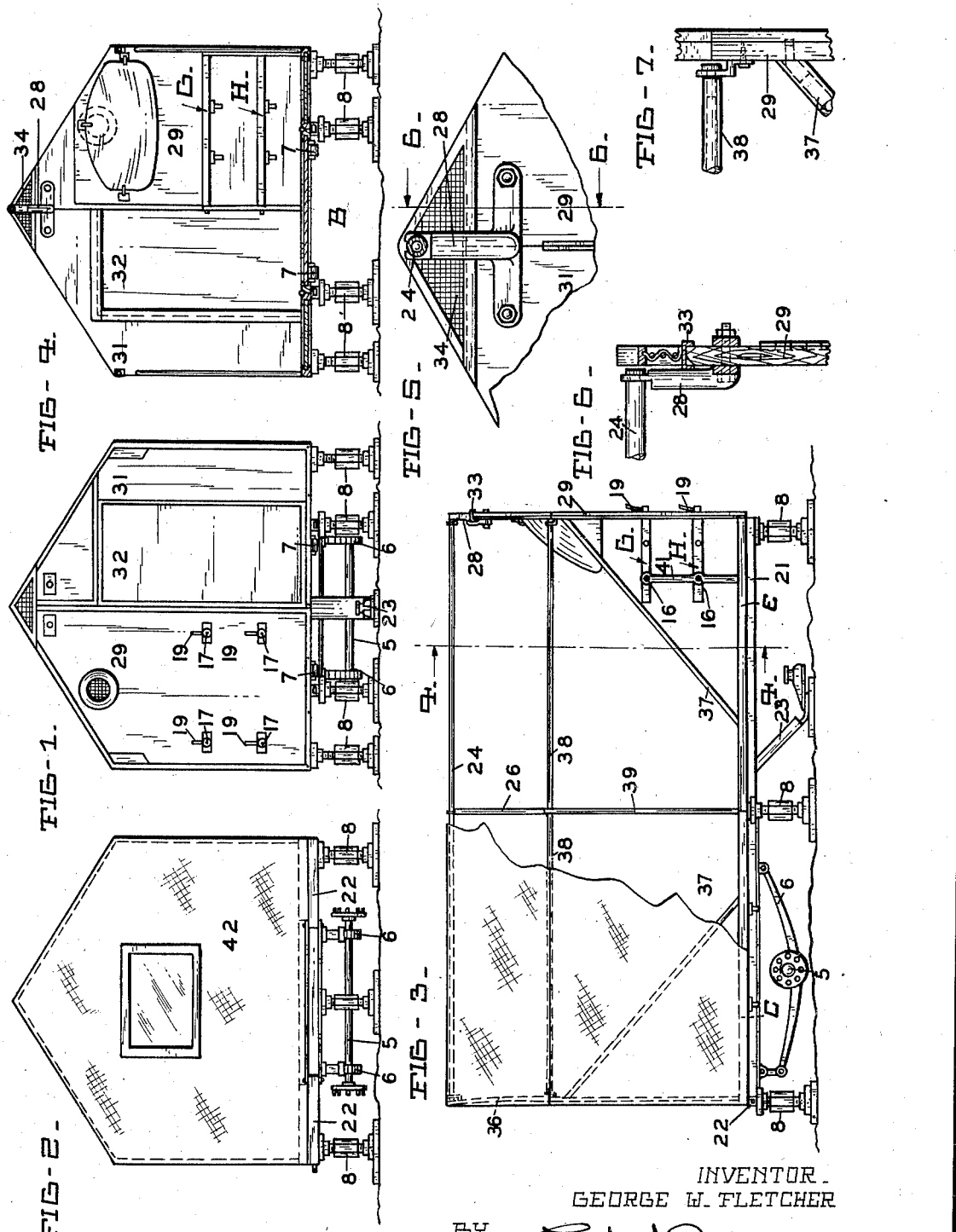
INVENTOR.
GEORGE W. FLETCHER
BY
ATTORNEY.

March 25, 1941.  G. W. FLETCHER  2,236,091
COMBINED TRAILER AND TENT CONSTRUCTION
Filed Sept. 3, 1940  3 Sheets-Sheet 2
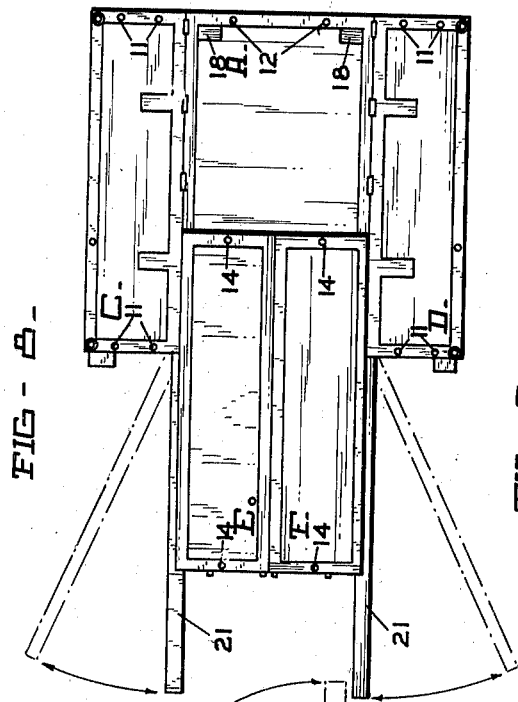
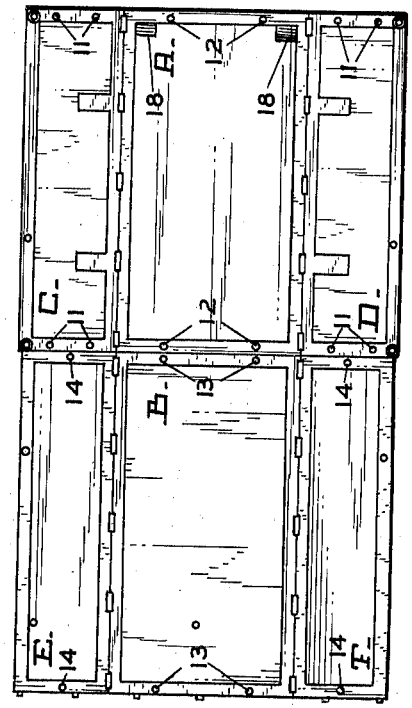
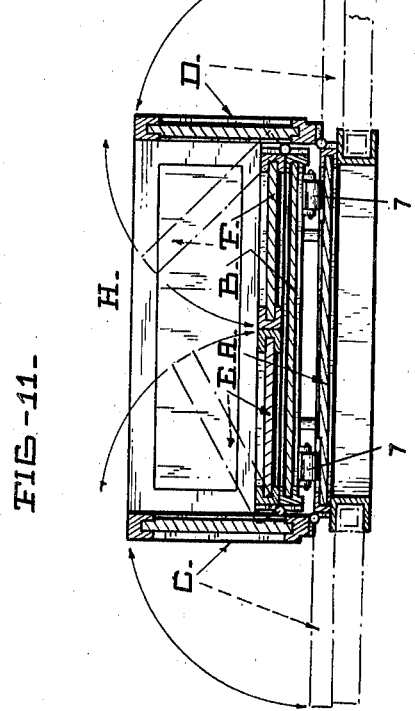
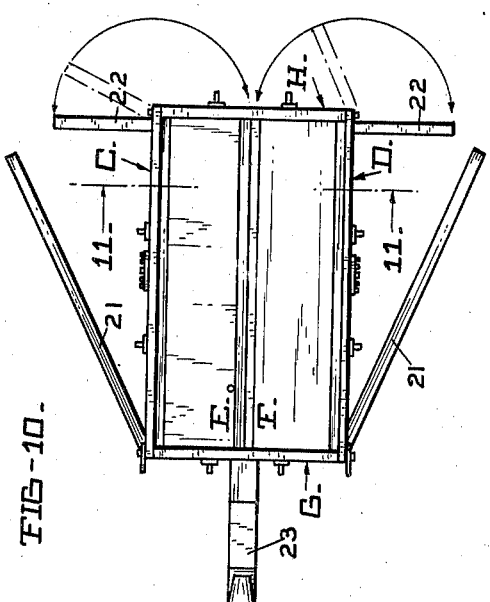
INVENTOR
GEORGE W. FLETCHER.
BY
ATTORNEY March 25, 1941.　　　G. W. FLETCHER　　　2,236,091
COMBINED TRAILER AND TENT CONSTRUCTION
Filed Sept. 3, 1940　　　3 Sheets-Sheet 3
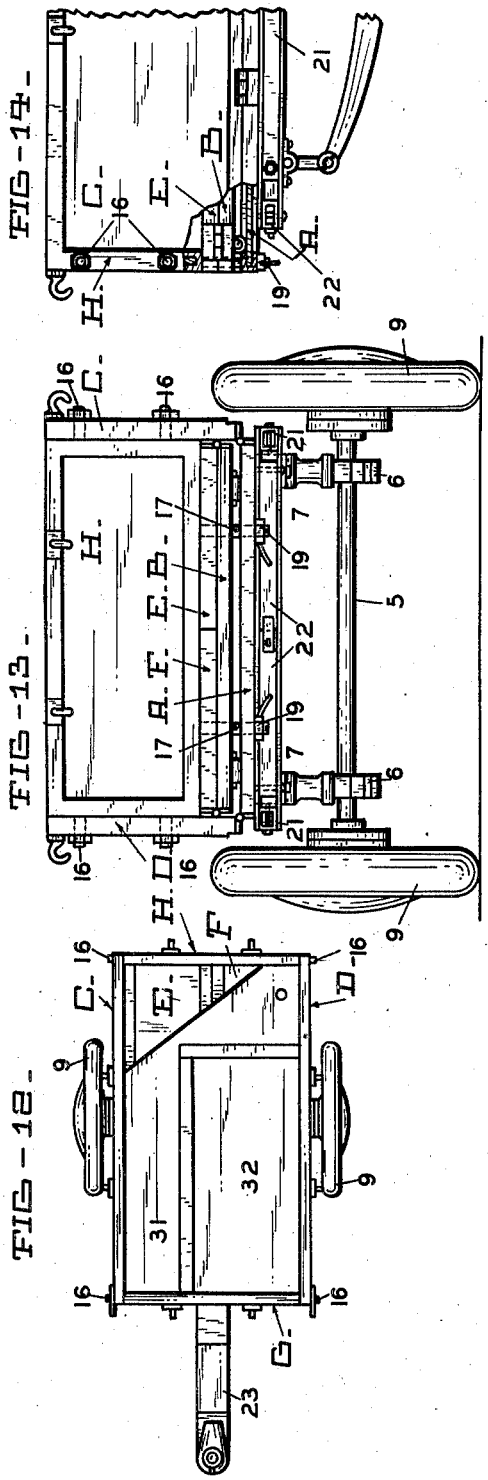
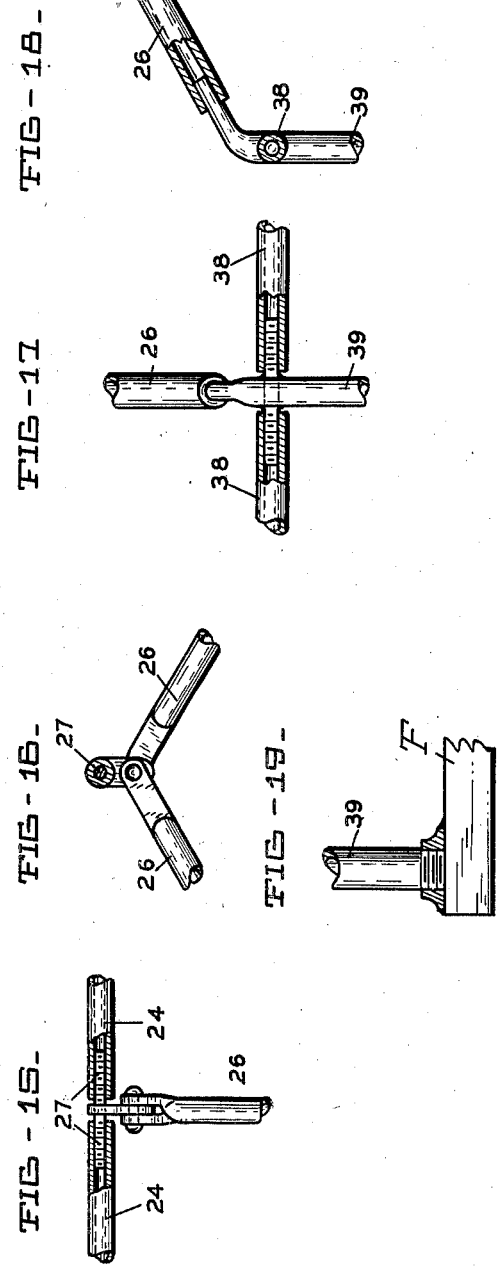
INVENTOR.
GEORGE W. FLETCHER.
BY
ATTORNEY.

Patented Mar. 25, 1941

2,236,091

UNITED STATES PATENT OFFICE 2,236,091

COMBINED TRAILER AND TENT CONSTRUCTION

George W. Fletcher, San Francisco, Calif.

Application September 3, 1940, Serial No. 355,136

5 Claims. (Cl. 135—1)

This invention relates to improvements in camping equipment and has particular reference to a trailer tent construction.

The principal object of this invention is to provide a camping equipment which consists of a trailer which may be towed behind a powered vehicle and thereafter dismantled in such a manner as to form a platform of large area upon which a tent frame may be positioned over which a fabric covering is stretched.

A further object of this invention is to produce a device of this character which is economical to manufacture, is neat in appearance, and one which may be quickly assembled either as a trailer or as a tent structure.

A further object of this invention is to provide means for locking the various parts rigidly together to avoid rattling during transportation and to provide a sturdy tent construction when used as a tent.

Other objects and advantages will be apparent during the course of the following description.

In the accompanying drawings forming a part of this specification and in which like numerals are employed to designate like parts throughout the same, Fig. 1 is an end elevation, showing the entrance end of the tent;

Fig. 2 is a similar view, showing the window end of the tent;

Fig. 3 is a side elevation, showing a portion of the tent structure broken away;

Fig. 4 is a cross sectional view taken on the line 4—4 of Fig. 3;

Fig. 5 is a fragmentary detailed view of the ventilating screen;

Fig. 6 is a cross sectional view taken on the line 6—6 of Fig. 5;

Fig. 7 is a fragmentary detailed view of the tent frame construction;

Fig. 8 is a top plan view of the floor partly unfolded;

Fig. 9 is a top plan view of the floor fully unfolded;

Fig. 10 is a top plan view of the floor completely folded to form the trailer body and shows the supporting braces partly extended;

Fig. 11 is a cross sectional view taken on the line 11—11 of Fig. 10;

Fig. 12 is a top plan view of the trailer completely assembled;

Fig. 13 is a rear elevation of the assembled trailer on an enlarged scale;

Fig. 14 is a fragmentary detailed view of the trailer construction; and

Figs. 15 to 19 inclusive are detailed views of the tent frame construction.

In camping it is common to use a tent to protect the users against the elements. These tents are usually placed upon the ground or upon a fixed wooden floor and may be transported to the camp site in any desired manner.

I have devised a camping outfit wherein the floor of the tent when folded forms the body of the trailer and in which the tent frame and the tent may be stored.

In the accompanying drawings wherein for the purpose of illustration is shown a preferred embodiment of my invention, the numeral 5 designates the axle of the trailer, upon which are mounted springs 6, supporting a vertical frame 10, to which is attached the main floor board A, and hinged thereto are side boards C and D. Slidably positioned on the main floor board A is an auxiliary floor board B, to which are hinged side members E and F. Rollers 7 are attached to the underside of the auxiliary floor board B (see Fig. 11).

The construction thus far described when placed in the position of Fig. 9 forms the floor of a relatively large tent and is supported above the ground in any suitable manner, as shown by adjustable jacks 8. It is, of course, understood that the wheels 9 are removed from the axle 5 when the floor is in this unfolded position.

Openings 11 are formed in the side boards C and D, and the purpose of these openings will be later seen. Openings 12 are formed in the main floor board A, and similar openings 13 are formed in the auxiliary floor board B. Openings 14 are formed in the side boards E and F and are so arranged that when these side boards are folded, as shown in Fig. 8, the openings 14 will overlie the openings 13; and the openings 13 are so positioned that when the auxiliary floor board B overlies the main floor board A, they will coincide with the openings 12.

End gates G and H are provided which have bolts or fastening elements 16 and bottom bolts or fastening elements 17, the purpose of which will be later seen.

The structure thus far described has to do with the trailer portion, and the manner of assembly is as follows:

Assuming the parts are in the position of Fig. 9, the first act is to fold the side boards E and F upon the auxiliary floor board B. Then the auxiliary floor board is lifted slightly so that the rollers 7 will roll upon the main floor board A, and the parts may be slid one upon the other, as illustrated in Fig. 8. These rollers 7 will come to rest in slight depressions 18 and will thus align the openings 13 with the openings 12. The end gates G and H are now placed in position, one at each end, with their fastening elements 17 passing downwardly through the openings 14, 13, and 12 so as to extend beneath the bottom of the main floor board A and to receive a swing nut 19, or other tightening means, as illustrated in Fig. 13. The sides C and D are now swung upwardly, and the fastening elements 16 will extend through the openings 11, after which nuts or other tightening means are placed thereon so as to secure the sides to the end gates. Thus, from the floor structure of the tent I have formed the box-like body of the trailer, all the parts being held in rigid position, thus eliminating rattling during transportation.

Referring to Fig. 10, it will be noted that I have provided hinged floor supports 21 which when swung from a position parallel to the frame of the vehicle to the position of Fig. 8, form supports for the auxiliary floor board B. Also, I have provided swinging side supports 22 which serve to support the sides C and D. The towing tongue for trailing purposes is shown at 23.

When the floor is in extended position, I mount thereon a tubular frame comprising a jointed ridge pole 24 which is fastened to a hinged central brace 26 through the medium of threaded bolts 27. The opposite ends of the ridge pole are provided with a groove which engages the bifurcated end of the upstanding brace 28.

One end of the tent frame is formed by hinging together panels 29 and 31, the panel 31 having a door 32. In order to keep the panels in extended position, I provide a channel member 33 which is attached to the brace 28, which channel 33 fits over the upper ends of the panels, as illustrated in Fig. 6. A screen 34 is mounted upon the top of the channel and forms ventilation for the top of the tent. The tent frame may be sprung, as indicated in dotted lines at 36, so as to place a tension on the ridge pole, thus creating a much more rigid structure. The braces 37 are secured to the floor and to the two end structures so as to prevent end movement of the tent. The eave frame is shown at 38, and the center support at 39.

When the tent is erected, the end gates G and H are employed as shelves, as shown in Figs. 3 and 4, the elements 16 being employed to engage the support 41, while the elements 17 extend through the front of the panel 29. When the swing nuts 19 are tightened into place, they form hooks upon which camping equipment may be hung.

After the framework has been erected, a fabric covering 42 is placed over the same and is attached to the edges of the panels 29 and 31, thus completing the tent structure upon a wooden platform.

It will thus be seen that I have produced a structure which is simple in construction, easy to assemble and disassemble, one wherein comfortable camping quarters may be had, and a structure which when folded into a trailer construction may be readily transported with the assurance that the parts will all be held in a rigid manner and without unnecessary rattling.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A combined tent floor board and trailer, comprising a portable frame, a main floor board secured thereto, side boards hinged to said main floor board, floor supports hinged to said frame and adapted to support an auxiliary floor board in the same plane as said main floor board, side boards hinged to said auxiliary floor board, and fastening means including end gates for securing said main and auxiliary floor boards superimposed one upon the other for transportation, the sides of said main floor board and said fastening means forming a box-like structure.

2. In a device of the class described, a wheel mounted axle, a main floor board mounted above said axle, side boards hinged to said main floor board, an auxiliary floor board removably mounted on said main floor board, side boards hinged to said auxiliary board so as to lie parallel thereto during transportation, coinciding openings formed through said second-mentioned side boards, said auxiliary floor board, and said main floor board, end gates having bolts extending therefrom and adapted to extend through said openings, whereby tightening elements may be threaded thereto, and similar bolt elements extending from said end gates through said first-mentioned side boards and adapted to receive tightening elements thereon.

3. In a device of the character described, an axle, wheels mounted on said axle, a floor board mounted above said axle, an auxiliary floor board slidably mounted on said floor board, rollers carried by said auxiliary floor board and adapted to rest in pockets in said first-mentioned floor board, whereby said floor boards will be aligned, side boards hinged to said auxiliary floor board and adapted to overlie said auxiliary floor board, side boards hinged to said first-mentioned floor board, end gates mounted at each end of said last-mentioned side boards to form a box-like structure, bolts carried by said end gates and extending downwardly through openings formed in said floor boards and said first-mentioned side boards, whereby tightening elements lock said parts in fixed position, bolts extending from said end gates through said second-mentioned side boards, and locking elements applied thereto to form a rigid box-like structure.

4. A combined tent floor and trailer, comprising a wheeled frame, a pair of superimposed floor boards mounted thereon, one of said floor boards being secured to said frame, the other of said floor boards being free to move longitudinally into the same plane as said secured floor board, said secured floor board having hinged sides, end pieces secured to said side boards to form a box-like structure, side pieces hinged to said longitudinally movable floor board and resting thereon when said floor boards are superimposed, said side boards forming an extension of their respective floor boards when said floor boards are in the same plane, and said end gates being supported above said floor boards to form shelves when said floor boards and said side boards are extended to form a tent floor.

5. A combined tent floor and trailer, comprising a wheeled frame, a pair of superimposed floor boards mounted thereon, one of said floor boards being secured to said frame, the other of said floor boards being free to move longitudinally into the same plane as said secured floor board, said secured floor board having hinged sides, end pieces secured to said side boards to form a box-like structure, side pieces hinged to said longitudinally movable floor board and resting thereon when said floor boards are superimposed, said side boards forming an extension of their respective floor boards when said floor boards are in the same plane, and said end gates being supported above said floor boards to form shelves when said floor boards and said side boards are extended to form a tent floor, and a tent frame mounted on said tent floor and supporting said end gate shelves.

GEORGE W. FLETCHER.